US009042640B2

(12) United States Patent
Bala et al.

(10) Patent No.: US 9,042,640 B2
(45) Date of Patent: May 26, 2015

(54) METHODS AND SYSTEM FOR ANALYZING AND RATING IMAGES FOR PERSONALIZATION

(75) Inventors: Raja Bala, Webster, NY (US); Zhigang Fan, Webster, NY (US); Hengzhou Ding, Webster, NY (US); Jan P. Allebach, West Lafayette, IN (US); Charles A. Bouman, West Lafayette, IN (US); Reuven J. Sherwin, Ra'anana (IL)

(73) Assignee: XEROX CORPORATION, Norwalk, CT (US)

( * ) Notice: Subject to any disclaimer, the term of this patent is extended or adjusted under 35 U.S.C. 154(b) by 98 days.

(21) Appl. No.: 13/349,751

(22) Filed: Jan. 13, 2012

(65) Prior Publication Data
US 2013/0182946 A1 Jul. 18, 2013

(51) Int. Cl.
*G06K 9/62* (2006.01)
*G06K 9/00* (2006.01)
*G06K 9/32* (2006.01)

(52) U.S. Cl.
CPC .......... *G06K 9/00671* (2013.01); *G06K 9/3258* (2013.01)

(58) Field of Classification Search
None
See application file for complete search history.

(56) References Cited

U.S. PATENT DOCUMENTS

| | | | | |
|---|---|---|---|---|
| 5,901,245 | A * | 5/1999 | Warnick et al. | 382/190 |
| 6,711,291 | B1 * | 3/2004 | Stubler et al. | 382/195 |
| 2006/0008177 | A1 * | 1/2006 | Chermont et al. | 382/284 |
| 2006/0165291 | A1 * | 7/2006 | Atsumi et al. | 382/190 |
| 2009/0154795 | A1 * | 6/2009 | Tan et al. | 382/155 |
| 2010/0156919 | A1 * | 6/2010 | Bala et al. | 345/582 |
| 2010/0302594 | A1 * | 12/2010 | Chapman et al. | 358/1.18 |

OTHER PUBLICATIONS

Ding, H., Bala, R., Fan, Z., Eschbach, R., Bouman, C. A., and Allebach, J. P., "Semi-Automatic Object Geometry Estimation for Image Personalization," in [Proc. SPIE-IS&T Electronic Imaging: Computational Imaging VIII], Bouman, C. A., Pollak, I., and Wolfe, P. J., eds., 7533 (Jan. 18, 2010).*
H.D. Cheng et al., "Color Image Segmentation: Advances and Prospects" Pattern Recognition, vol. 34, No. 12, pp. 2259-2281, Dec. 2001.
Y. Zhong et al., "Locating Text in Complex Color Images" Pattern Recognition, vol. 28, No. 10, 1995, pp. 1523-1535.
K. Jung et al., "Text Information Extraction in Images and Video: A Survey" Pattern Recognition, vol. 37, No. 5, pp. 977-997, May 2004.
K.I. Kim et al., "Texture-Based Approach for Test Detection in Images using Support Vector Machines and Continuously Adaptive Mean Shift Algorithm" IEEE Transaction on Pattern Analysis and Machine Intelligence, vol. 25, No. 12, 2003, pp. 1631-1639.
C.M. Bishop, Pattern Recognition and Machine Learning, $2^{nd}$ ed. Springer, 2007, pp. 205-206, pp. 209-210.

* cited by examiner

*Primary Examiner* — Vu Le
*Assistant Examiner* — Guillermo Rivera-Martinez
(74) *Attorney, Agent, or Firm* — Fay Sharpe LLP (57) ABSTRACT

As set forth herein, a computer-implemented method facilitates pre-analyzing an image and automatically suggesting to the user the most suitable regions within an image for text-based personalization. Image regions that are spatially smooth and regions with existing text (e.g. signage, banners, etc.) are primary candidates for personalization. This gives rise to two sets of corresponding algorithms: one for identifying smooth areas, and one for locating text regions. Smooth regions are found by dividing the image into blocks and applying an iterative combining strategy, and those regions satisfying certain spatial properties (e.g. size, position, shape of the boundary) are retained as promising candidates. In one embodiment, connected component analysis is performed on the image for locating text regions. Finally, based on the smooth and text regions found in the image, several alternative approaches are described herein to derive an overall metric for "suitability for personalization."

20 Claims, 12 Drawing Sheets
(5 of 12 Drawing Sheet(s) Filed in Color)

FIG. 16

METHODS AND SYSTEM FOR ANALYZING AND RATING IMAGES FOR PERSONALIZATION

TECHNICAL FIELD

The present exemplary embodiments broadly relate to image personalization. However, it is to be appreciated that the present exemplary embodiments are also amenable to other like applications.

BACKGROUND

Today, there is great interest in the personalization and customization of images as a way to add value to documents. This is especially true in transactional and promotional marketing applications, but is gaining traction in more image intensive markets such as photo finishing, whereby personalized calendars, photobooks, greeting cards, and the likes are created. Several technologies currently exist to personalize images such as XMPie, DirectSmile, and AlphaPictures, for example. In such applications, a photorealistic result is intended, since the targeted products include calendars or other "long term" print pieces. At the same time, these approaches are cumbersome and complicated, requiring stock photos, sophisticated design tools, and designer input with image processing experience.

Image personalization is a popular concept, and finds application in promotion, transpromo, calendars, marketing, etc. One form of image personalization incorporates variable text into a fixed image in a natural way. U.S. Publication No. 2010/0156919 describes methods and a system for incorporating personalized text into an image that includes the elements of identifying a region for text insertion or replacement; estimating the 3D surface geometry within that region; and rendering the text onto the surface. The approach relates to planar surfaces, and relies upon the computation of vanishing points of convergent lines in the image that are parallel in the 3D scene. U.S. patent application Ser. No. 13/011,959 builds on this approach and relates methods to automatically estimate the location and orientation of the convergent lines from image features. U.S. patent application Ser. No. 12/964,820 describes a process for text personalization on curved (specifically cylindrical) surfaces. In these approaches, the user makes an initial judgment as to whether or not an image is suitable for personalization, and if so, where to insert or replace text within the image.

What are therefore needed are convenient and automated systems and methods to automatically assess how suitable an image is for personalization, and identify suitable regions in an image for insertion of personalized text into the image.

BRIEF DESCRIPTION

In one aspect, a computer-implemented method for pre-analyzing an image for text-based personalization comprises receiving an image selected by a user, and automatically analyzing the image and identifying candidate regions for personalization. The method further comprises presenting the candidate regions to the user via a graphical user interface (GUI), and deriving an overall metric for the suitability for personalization (SFP) of the image.

In another aspect, a computerized system that facilitates pre-analyzing an image for text-based personalization comprises a memory that stores computer-executable instructions, and a processor configured to execute the instructions, the instructions comprising receiving an image selected by a user, and automatically analyzing the image and identifying candidate regions for personalization. The instructions further comprise presenting the candidate regions to the user via a graphical user interface (GUI), and deriving an overall metric for the suitability for personalization (SFP) of the image.

BRIEF DESCRIPTION OF THE DRAWINGS

The file of this patent contains at least one drawing executed in color. Copies of this patent with color drawing(s) will be provided by the United States Patent and Trademark Office upon request and payment of the necessary fee.

FIG. 13 shows an image in which "good" regions for personalization are presented to the user via a GUI or the like.

DETAILED DESCRIPTION

The systems and methods described herein can be utilized to automatically and intelligently identify images and/or regions thereof that are suitable for text insertion and/or replacement to personalize the image(s). Accordingly, the methods described herein facilitate pre-analyzing an image and automatically suggesting to the user the most suitable regions within an image for text-based personalization. Image regions that are spatially smooth and regions with existing text (e.g. signage, banners, etc.) are primary candidates for personalization. This gives rise to two sets of corresponding algorithms: one for identifying smooth areas, and one for locating text regions. Smooth regions are found by dividing the image into blocks and applying an iterative combining strategy, and those regions satisfying certain spatial properties (e.g. size, position, shape of the boundary) are retained as promising candidates. In one embodiment, connected component analysis is performed on the image. Finally, based on the smooth and text regions found in the image, several alternative approaches are described herein to derive an overall metric for "suitability for personalization."

A computer 50 can be employed as one possible hardware configuration to support the systems and methods described herein. It is to be appreciated that although a stand-alone architecture is illustrated, any suitable computing environment can be employed in accordance with the present embodiments. For example, computing architectures including, but not limited to, stand-alone, multiprocessor, distributed, client/server, minicomputer, mainframe, supercomputer, digital and analog can be employed in accordance with the present embodiment.

The computer 50 includes a processing unit (not shown) that executes, and a system memory (not shown) that stores, one or more sets of computer-executable instructions (e.g., modules, programs, routines, algorithms, etc.) for performing the various functions, procedures, methods, protocols, techniques, etc., described herein. The computer can further include a system bus (not shown) that couples various system components including the system memory to the processing unit. The processing unit can be any of various commercially available processors. Dual microprocessors and other multi-processor architectures also can be used as the processing unit.

As used herein, "algorithm" or "module" refers to a set of computer-executable instructions persistently stored on a computer-readable medium (e.g., a memory, hard drive, disk, flash drive, or any other suitable storage medium). Moreover, the steps of the methods described herein are executed by a computer, unless otherwise specified as being performed by a user.

The computer 50 typically includes at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A user may enter commands and information into the computer through a keyboard (not shown), a pointing device (not shown), a mouse, thumb pad, voice input, stylus, touchscreen, etc. The computer 50 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

Figure 1:
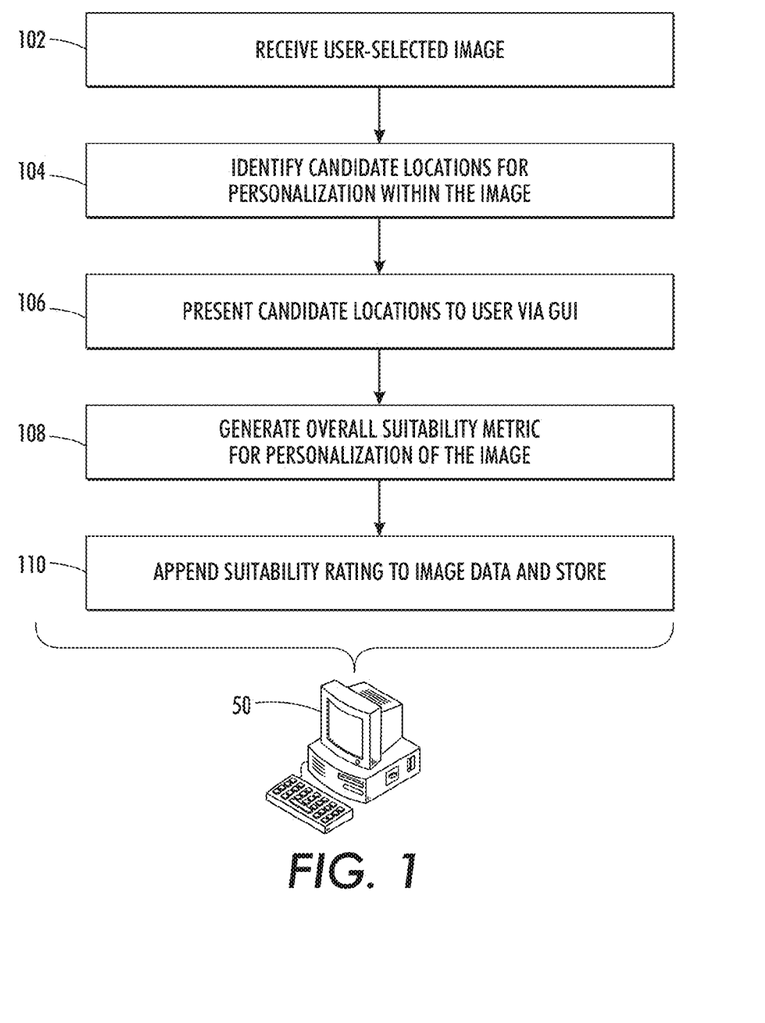
FIG. 1 illustrates a methodology for automatically pre-analyzing an image to determine suitability for personalization, determining and presenting an overall metric or rating for the image's "suitability for personalization" or SFP, and identifying and presenting the best candidate locations for personalization within the suitable image.

FIG. 1 illustrates a methodology for automatically pre-analyzing an image to determine suitability for personalization, determining and presenting an overall metric or rating for the image's "suitability for personalization" or SFP, and identifying and presenting the best candidate locations for personalization within the suitable image. The method is executed by a computer 50. At 102, a user-selected image is received. At 104, the image is analyzed and candidate regions or locations within the image are identified for personalization. At 106, the candidate locations are presented to the user via a graphical user interface or the like. At 108, an overall metric for suitability of the image for personalization is generated for the image itself and/or for one or more candidate regions. At 110, the suitability metric is appended to the image file data (i.e., the image can be tagged whereby the suitability metric ranking is included in the image file as metadata or the like) and stored. When a plurality of images and/or regions therein have been ranked and tagged, the images can further be presented to the user in order of suitability for personalization.

Figure 2:
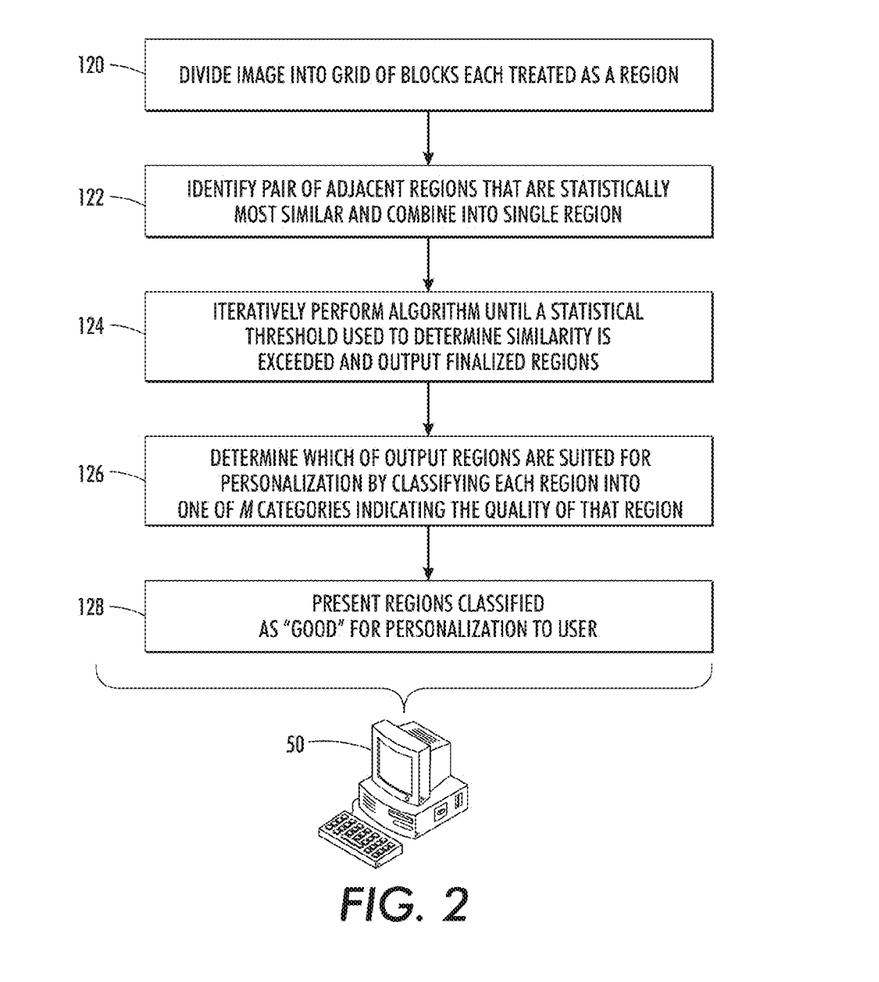
FIG. 2 illustrates an "unsupervised" method for identifying a region that is suitable for personalization wherein the user is not required to select an initial point for the region, in which a block-based connected component analysis is performed to find suitable candidate regions for personalization.
Figure 3:
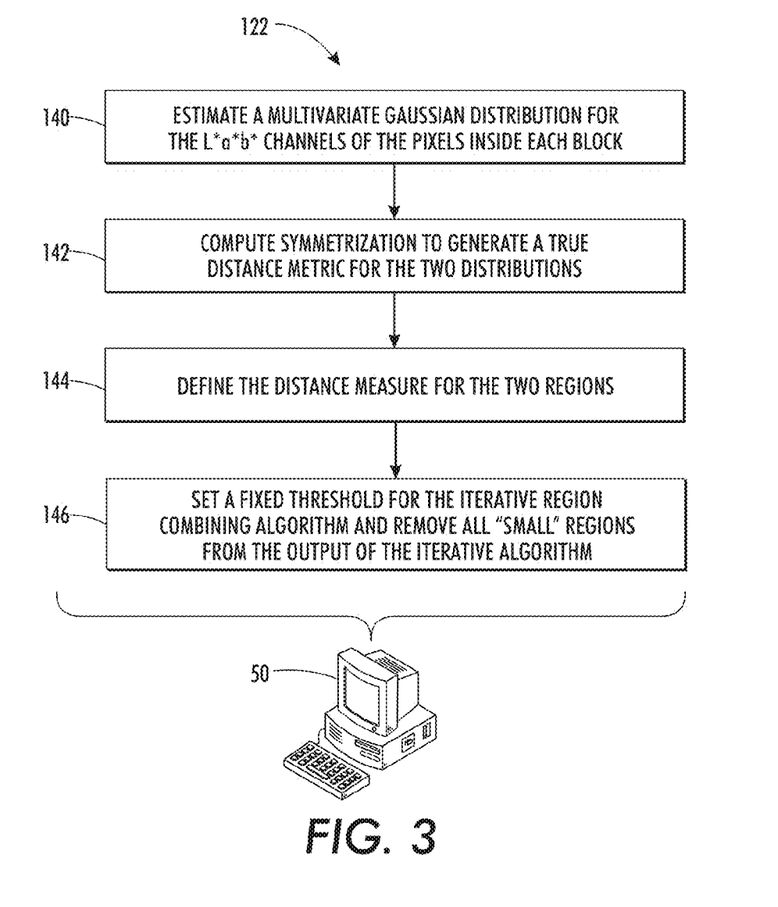
FIG. 3 illustrates a method for identifying the pair of adjacent regions (blocks, initially) that are statistically most similar and combining them into a single region.
Figure 4:
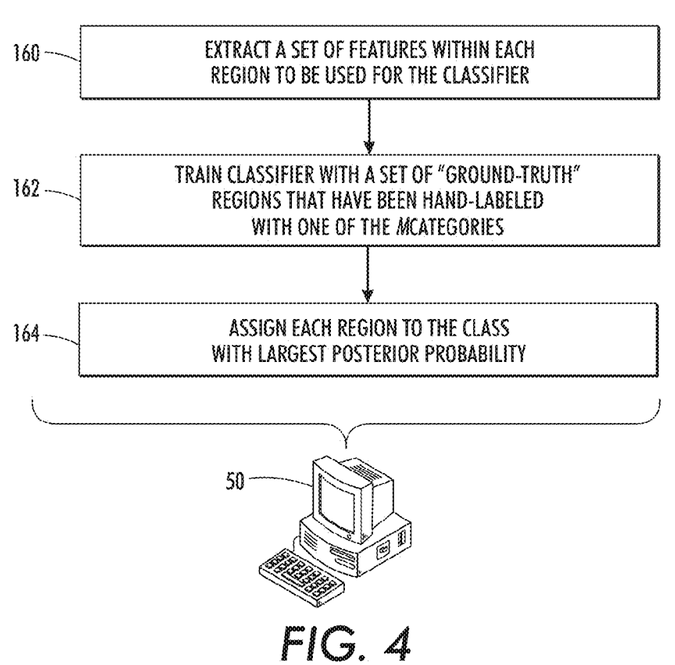
FIG. 4 illustrates a method for determining which of the finalized regions are suitable for personalization by classifying the regions according to their respective SFP levels.

According to various features described herein with regard to FIGS. 2-4, when uploading a given image for personalization, locations or regions within the image are suggested that can be effectively personalized by the design tool, thus reducing the time and iterations spent in the design process (i.e., minimizing or eliminating manual identification of suitable images and/or image regions by a user). In another example, if the user wishes to select a single image for personalization from a large collection, the "suitability for personalization" (SFP) metric can be pre-calculated for all images in that collection, stored, and fed to or retrieved by a file browsing application, which presents to the user the images sorted or ranked by SFP. The user can then quickly select from the top candidates. In a third scenario, the user may upload an image for a general image processing/editing task (i.e. not necessarily for personalization). The personalization analysis and SFP metric are calculated in the background. Only when the metric exceeds a predetermined threshold does the processor make a suggestion that this image is a good candidate for personalization, and offers an option to initiate the personalization process. All of these scenarios minimize wasted time and effort, and offer a productive design experience.

FIGS. 2-4 describe the method of FIG. 1 in greater detail. FIG. 2 illustrates an automated and "unsupervised" method for identifying a region that is suitable for personalization wherein the user is not required to select an initial point for the region. Here, a block-based connected component analysis is performed to find suitable candidate regions for personalization. The method is executed by a computer 50. At 120, the image is divided into a grid of blocks of pixels (e.g., 12-by-12, or some other suitable block size. The choice of block size is a heuristic one that is determined partially by image size and resolution. Initially, the algorithm treats each block as a separate region. At 122, the pair of adjacent regions (blocks, initially) that are statistically most similar are identified, and combined into a single region. This process is iteratively repeated, at 124, until the statistical threshold used to determine similarity is exceeded, at which point, the finalized regions are output (i.e., regions that cannot be further combined with other regions). At 126, a determination is made regarding which of the output regions is/are suitable for personalization by classifying each region into one of M categories, where M is an integer and where the categories correspond to SFP levels. In one example, three categories are employed: good, moderate, and bad. At 128, regions classified as "good" are presented to the user as candidates for personalization.

FIG. 3 illustrates a method for identifying the pair of adjacent regions (blocks, initially) that are statistically most similar and combining them into a single region, as described with regard to 122 of FIG. 2. The method is executed by a computer 50. At 140, a multivariate Gaussian distribution for the color (e.g. L*a*b*) channels of the pixels in each block or region is estimated. At 142, a symmetric distance metric is computed for the two estimated Gaussian distributions. At 144, the distance measure for each region is defined. At 146, a fixed threshold is set for the iterative region-combining algorithm, and "small" regions (e.g., regions output by the algorithm that comprise 2% or less of the image being analyzed, or some other predetermined threshold) are removed from the output of the iterative algorithm. The foregoing acts are iteratively performed (at 124 of FIG. 2) to identify finalized regions that may be personalized. The identified finalized regions are then analyzed to determine their respective SFP levels (at 126 and 128 of FIG. 2).

FIG. 4 illustrates a method for determining which of the finalized regions are suited for personalization and classifying the regions according to their respective SFP levels, such as is described with regard to 126 of FIG. 2. The method is executed by a computer 50. At 160, a set of features is extracted within each region to be used by the classifier. At 162, the classifier is trained using a set of "ground-truth" regions that have been manually labeled as belonging to one of the M categories. At 164, the region is assigned to the class/category with the largest posterior probability.

Figure 5:
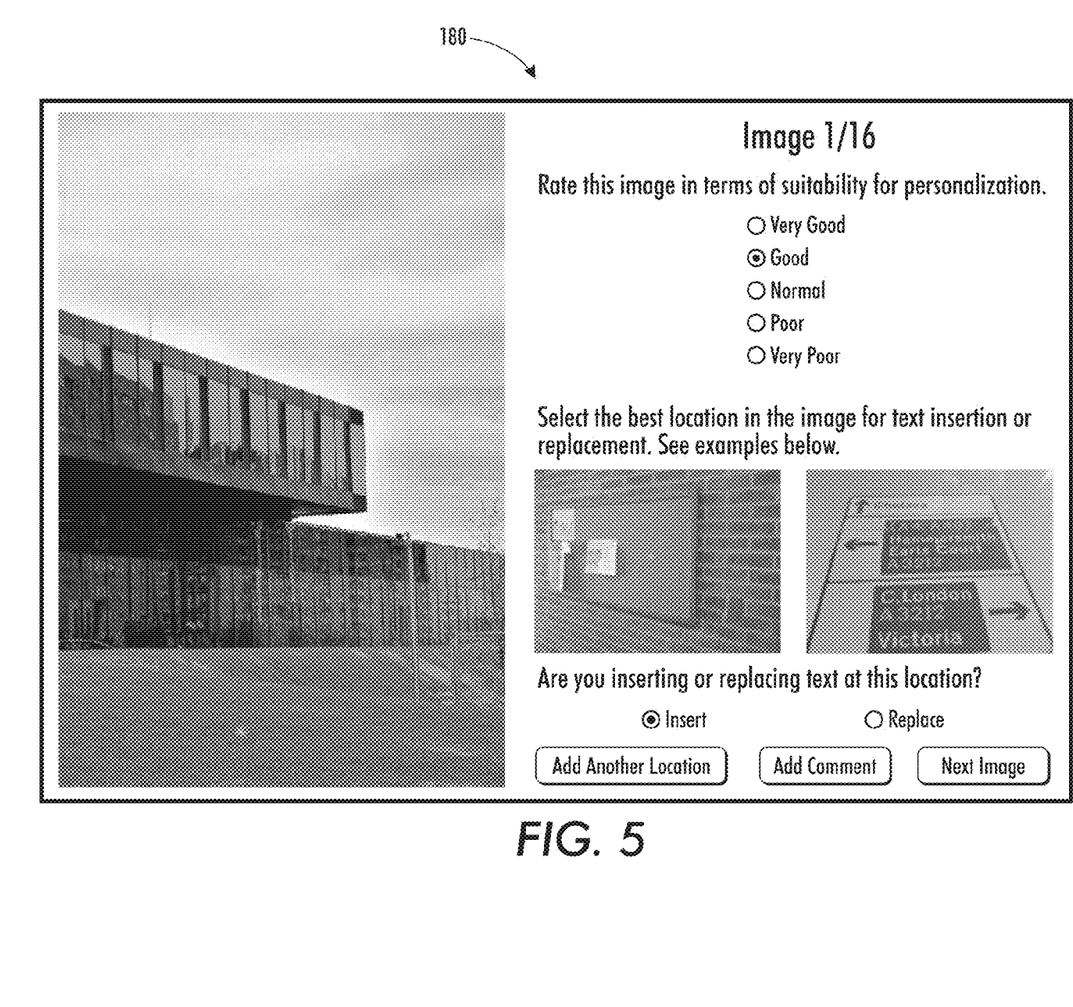
FIG. 5 illustrates a screenshot of a graphical user interface (GUI) that can be employed to permit designers to rate a set of images based on their overall personalization suitability, with five options ranging from "very poor" to "very good." The GUI also allows designers to select suitable locations for personalization.

FIGS. 5-16 provide additional detail regarding the acts of the methods of FIGS. 1-4. FIG. 5 illustrates a screenshot of a graphical user interface (GUI) 180 that can be employed to permit designers to rate a set of images based on their overall personalization suitability, with five options ranging from "very poor" to "very good." Rating of images by one or more designers may be performed off-line to generate SFP metrics and initially train one or more classifiers that are used when performing the methods of FIGS. 1-4. The designers can select locations that they want to personalize (by either inserting or replacing text) by placing asterisks 182 inside the image. The designers can also provide rationale for their ratings and choices via the interface 180. According to an example, a number of images (e.g., 16, 20, etc.) are sequentially displayed on the left side of the GUI, while instructions are shown on the right.

Figure 6:
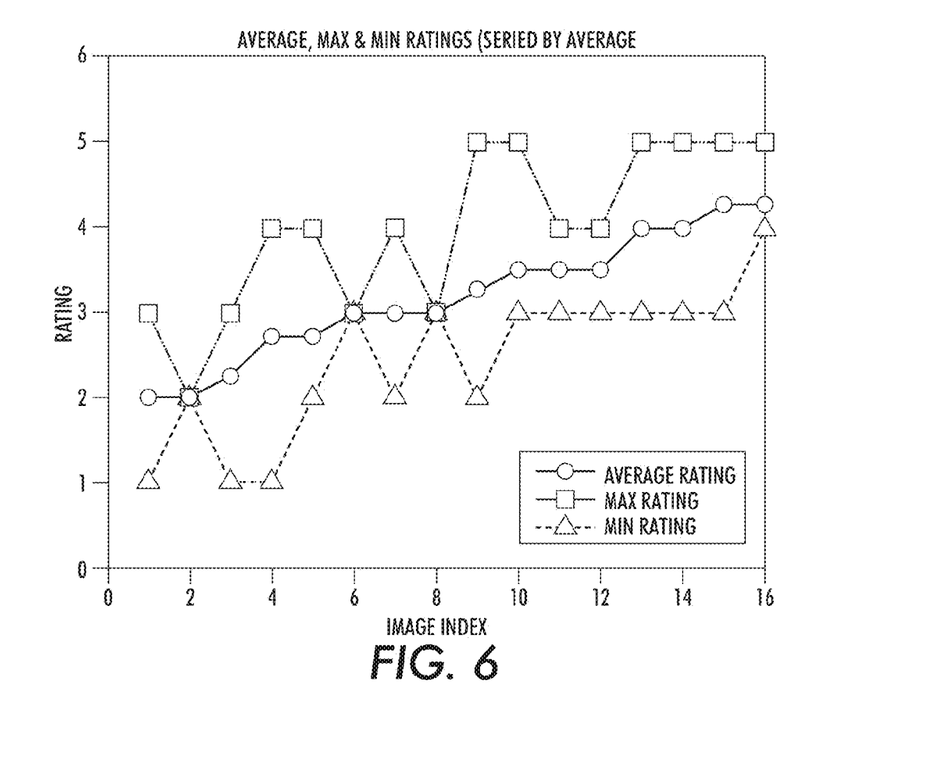
FIG. 6 illustrates a plot of overall ratings of personalization suitability for a set of the images presented to one or more designers.

FIG. 6 illustrates a plot 190 of overall ratings by the designers, of personalization suitability for all of the images presented to them (e.g., 16 in this example). The horizontal axis is the image index, which is sorted according to the average rating by all designers (e.g., four designers, according to this example). The vertical axis is the rating, with "very poor" corresponding to 1, and "very good" corresponding to 5. The blue curve is the average rating, while the green and red curves are the minimal and maximal rating, respectively, across the designers.

Several observations may be noted when identifying suitability characteristics for training images. Smoothly varying regions (i.e. those exhibiting little detail or texture) can be good potential candidates. However, other factors also play a role, e.g. shape, perspective, and location of the region within the image, as well as the type of object and the associated text effects that can be used on the object (e.g. "cloud font" in the sky, chalk on the pavement, etc.). Additionally, regions containing existing text (e.g. signage, banners, etc.) are good candidates for personalization, since by definition, such regions are plausible candidates for text messages, and the viewer is naturally drawn to them. The text regions should be greater than or equal to a minimum size and resolution in order to garner visual attention. Moreover, considerable variability may exist from one designer to another (as shown in FIG. 6), and most of the differences arise at a higher cognitive level. For example, designers may rate an image based on how effectively it conveys an intended message, aesthetic content, visual attention, etc. While some of this cognitive reasoning is difficult to codify, there are at least two principles that can be used to guide low-level image analysis for determining SFP: namely locating smooth regions, and identifying text regions. These principles are described in greater detail with regard to FIGS. 7-16, below.

Smooth regions with little detail or texture are potential candidates for personalization. To find these regions, a segmentation is computed. In contrast to conventional approaches, the methods described with regard to FIGS. 1-4 are automated and "unsupervised," meaning that they do not require user input to identify suitable image regions for personalization.

Figure 7:
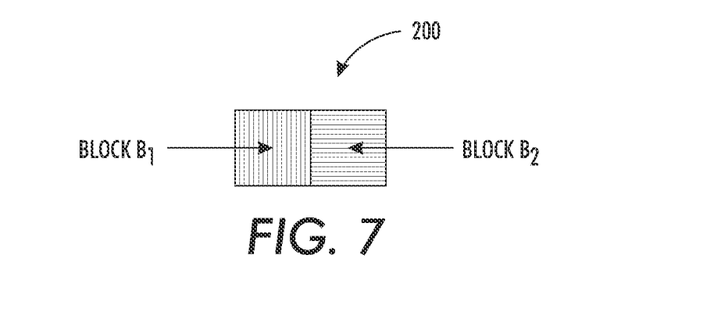
FIG. 7 illustrates a pair of adjacent blocks, labeled $B_1$ and $B_2$.

With reference back to FIGS. 2 and 3, FIG. 7 illustrates a pair of adjacent blocks 200, labeled $B_1$ and $B_2$. When identifying a pair of adjacent regions as set forth in 122 of FIGS. 2 and 3, only pairs of regions that are geographically adjacent are considered, which excludes unattached regions. Second, the similarity measure for a pair of adjacent regions is computed using a Kullback-Leibler (KL) divergence. To elaborate, as set forth at 140 (FIG. 3) a multivariate Gaussian distribution is estimated for the color (e.g. L*a*b*) channels of the pixels inside each block (independence across the three channels is assumed). In other words, each 12-by-12 block is readily represented by a multivariate Gaussian distribution. For two blocks $B_1$ and $B_2$ that are adjacent as illustrated in FIG. 7, the KL divergence is given by:

$$KL(B_1 \| B_2) = \frac{1}{2} \sum_i \left( \ln \frac{\sigma_{i,2}^2}{\sigma_{i,1}^2} + \frac{\sigma_{i,1}^2}{\sigma_{i,2}^2} + \frac{(\mu_{i,1} - \mu_{i,2})^2}{\sigma^{2i,2}} - 1 \right),$$

with $\{(\mu_{i,1}, \sigma_{i,1}^2) | i = L^*, a^*, b^*\}$ and $\{(\mu_{i,2}, \sigma_{i,2}^2) | i = L^*, a^*, b^*\}$ being the means and variances for the two distributions on $B_1$ and $B_2$, respectively.

As described with regard to 142 (FIG. 3), a symmetrization is computed to generate a true distance metric for the two block distributions, such that:

$$D(B_1, B_2) = \frac{1}{2}(KL(B_1 \| B_2) + KL(B_2 \| B_1)).$$

Figure 8:
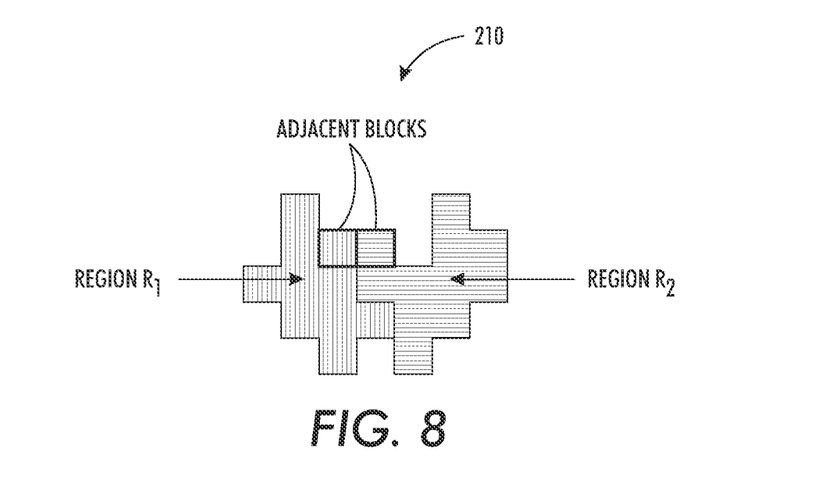
FIG. 8 is an illustration of two adjacent regions, labeled $R_1$ and $R_2$, in which multiple pairs of blocks from the two regions $R_1$ and $R_2$ are adjacent to each other.

D(B1, B2) represents a block-to-block distance. FIG. 8 is an illustration 210 of two adjacent regions, labeled $R_1$ and $R_2$, in which multiple pairs of blocks from the two regions $R_1$ and $R_2$ are adjacent to each other. As described with regard to 144 (FIG. 3), a distance measure for the two regions is defined.

The distance measure is an average of the block-to-block distances computed over all pairs of adjacent blocks from the two regions $R_1$ and $R_2$. The final distance measure between two regions is given by:

$$D(R_1, R_2) = \frac{1}{N} \sum_{i,j} D(B_i, B_j) \text{ where } i \in R_1, j \in R_2, i \in \partial j.$$

Here N is the total number of adjacent block pairs from the two regions. Small regions (e.g., less than 2% or some other predefined percentage of the area of the original image) are excluded from the output of the iterative algorithm. Additionally, the remaining regions are morphologically closed and opened.

Figure 9:
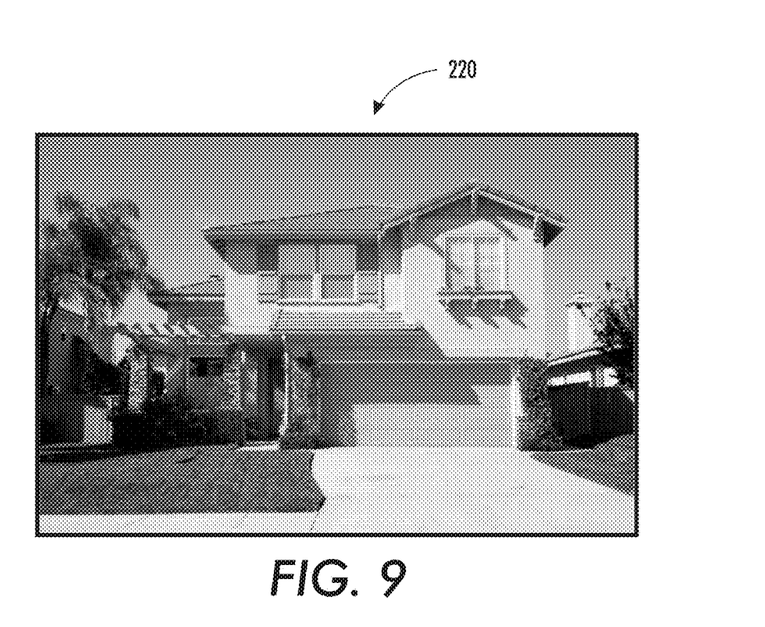
FIG. 9 is an example of an input image.

FIG. 9 is an example of an input image 220 on which the herein-described methods, algorithms, etc. may be performed. The image 220 shows several flat surfaces that may be identified as candidate regions for personalization.

Figure 10:
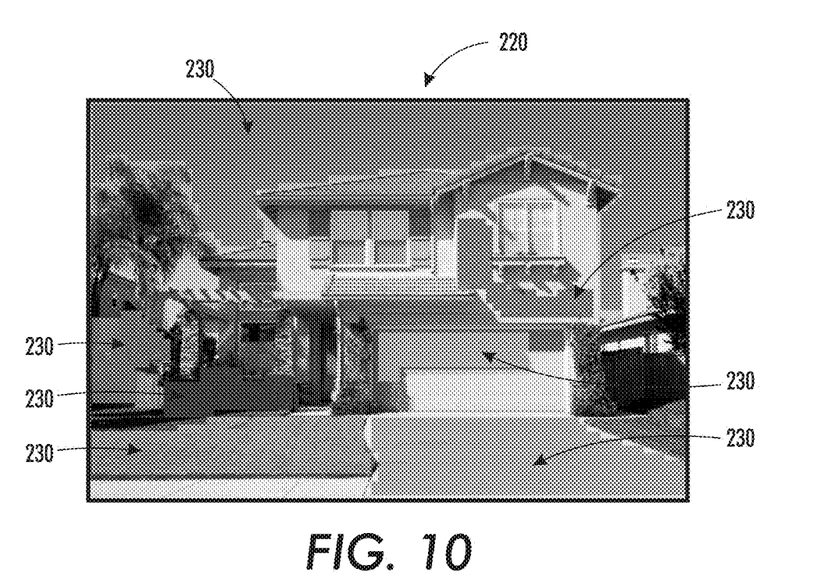
FIG. 10 shows the image with a plurality of identified candidate regions.

FIG. 10 shows the image 220 with a plurality of identified candidate regions 230, such as are identified at 104 (FIG. 1) and by the herein described methods. Not all regions obtained from the algorithm are equally suitable for personalization. In FIG. 10, for example, the regions detected on the driveway and grass, as well as on the garage door may be more suitable for personalization than the regions detected in the lower left under the shadow of the tree. The sky region is smooth, but is likely to be interpreted as the background of the image, and thus may be only moderately suitable for personalization.

Figure 11:
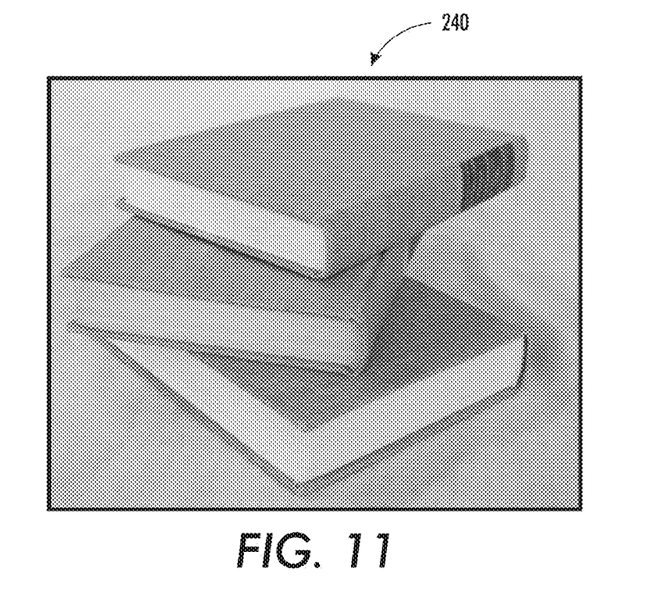
FIG. 11 shows an example of an input image on which the described techniques may be employed.
Figure 12:
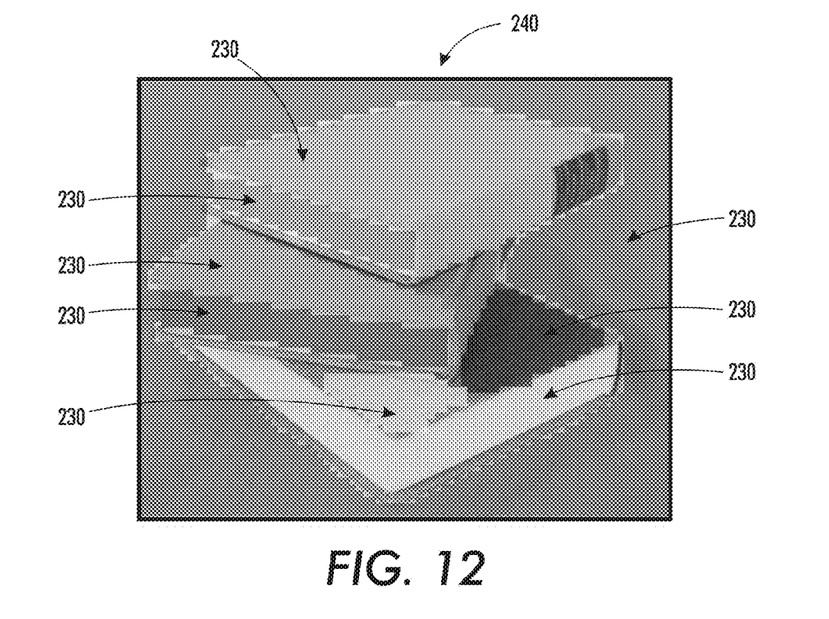
FIG. 12 illustrates the image with identified candidate regions for personalization.

FIG. 11 shows another example of an input image 240 on which the described techniques may be employed. FIG. 12 illustrates the image 240 with identified candidate regions 230 for personalization.

Accordingly, the identified regions are analyzed to determine which of the regions is/are suitable for personalization as described with regard to 126 (FIG. 2). In one embodiment, a machine learning/classification technique is employed, such as is described with regard to 108 of FIG. 1, 128 of FIG. 2, and the method of FIG. 4. Each region is classified into one of M categories of varied suitability, where M is an integer. By way of example and not by way of limitation, three categories may be considered: "Good," "Moderate," and "Bad," indicating the quality of that region for personalization. To classify the identified regions into their respective categories, a set of features are extracted from within each region to be used for the classifier, as set forth at 160 (FIG. 4). The extracted features may include without limitation: region size (e.g., percentage of area occupied); region compactness (e.g., a ratio between the area of the region and the area of a circle that has the same perimeter as the region); region location (e.g., a gravity center of the region); mean region color (e.g., a median color of an estimated mean for all blocks; region variance (e.g., a median value of estimated variance for all blocks); a number of detected straight lines within the region; a ratio of perimeter blocks that lie on any detected straight lines over all perimeter blocks; etc.

The classifier is trained with a set of "ground-truth" regions that have been manually labeled with one of M categories, as set forth at 162 (FIG. 4). In one example, 46 images with 250 detected regions were visually inspected and manually labeled into 3 categories. Principles identified from designer input described with regard to FIGS. 5 and 6 can be used to perform the labeling. It will be appreciated that any suitable classification techniques can be used. In one embodiment, a multinomial logistic regression classifier is used as follows:

$$p(C_k \mid \phi) = y_k(\phi) = \frac{\exp(w_k^T \phi)}{\sum_j \exp(w_j^T \phi)},$$

Where $p(C_k|\phi)$ indicates the probability that a given feature vector $\phi$ belongs to class $C_k$ (k=1, 2, 3); $w_k$ are weights learned from training data; and $y_k(\phi)$ is the activation function. The region is then assigned to the class with largest posterior probability, as described at 164 (FIG. 4). In an image personalization GUI, the regions classified as "good" are then presented to the user, as described at 166 (FIG. 4).

Figure 13:
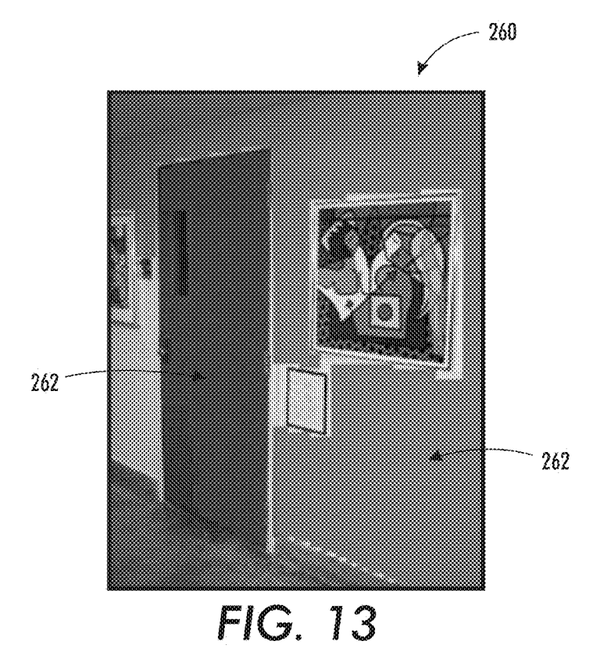

FIG. 13 shows an image 260 in which "good" regions 262 for personalization are presented to the user via a GUI or the like.

In accordance with other features of the present innovation, regions containing text in natural scenes are detected. Briefly described, connected component analysis is employed to determine closed contours as potential characters. Adjacent text characters are linked into text lines using a set of heuristics based on size and proximity of characters. Color information is employed to eliminate spurious linkages. A classification algorithm based on a set of relevant features is employed to further eliminate false-positive results.

Figure 14:
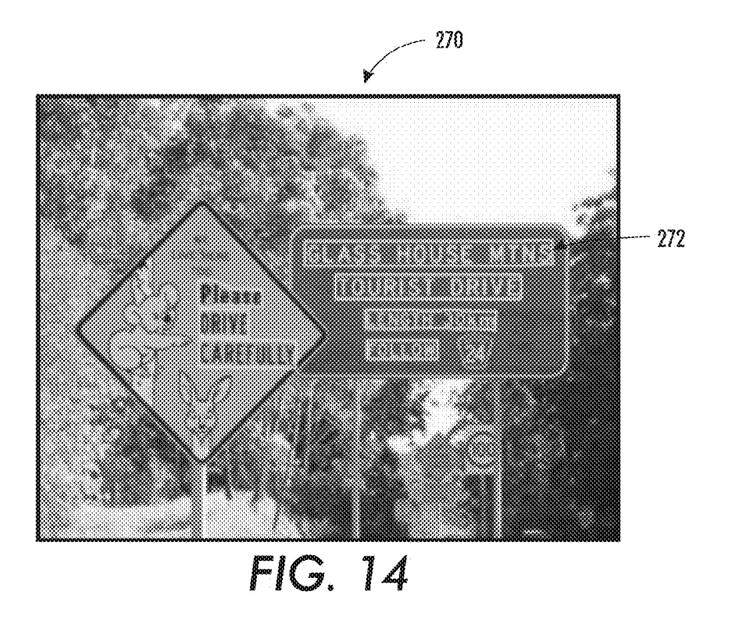
FIG. 14 shows an example of an image in which text regions have been identified.
Figure 15:
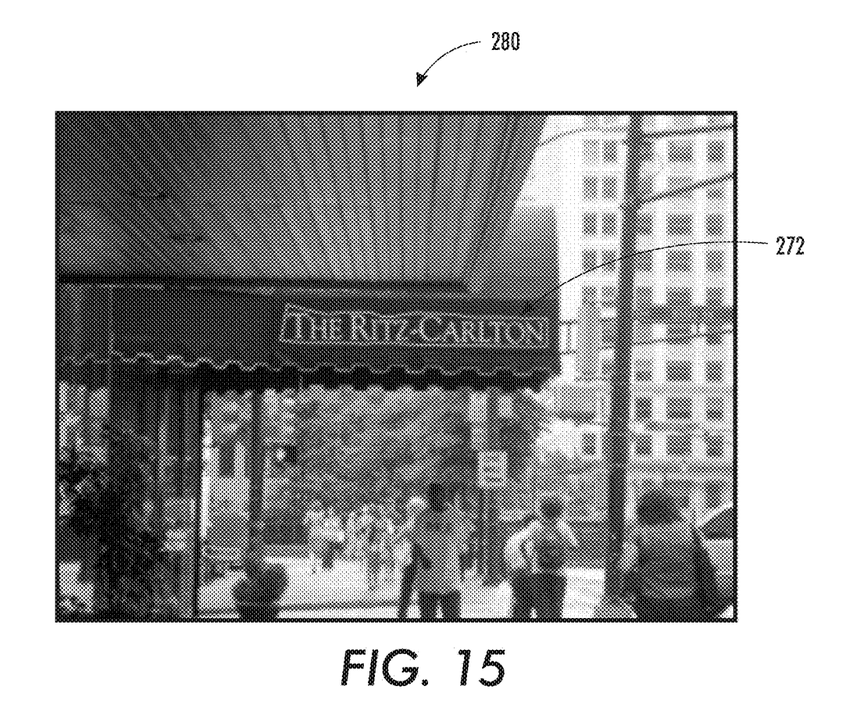
FIG. 15 shows an example of an image in which text regions have been identified.

FIGS. 14 and 15 show examples of images 270 and 280, respectively, in which text regions 272 have been identified in the images 270, 280 according to the foregoing method.

Figure 16:
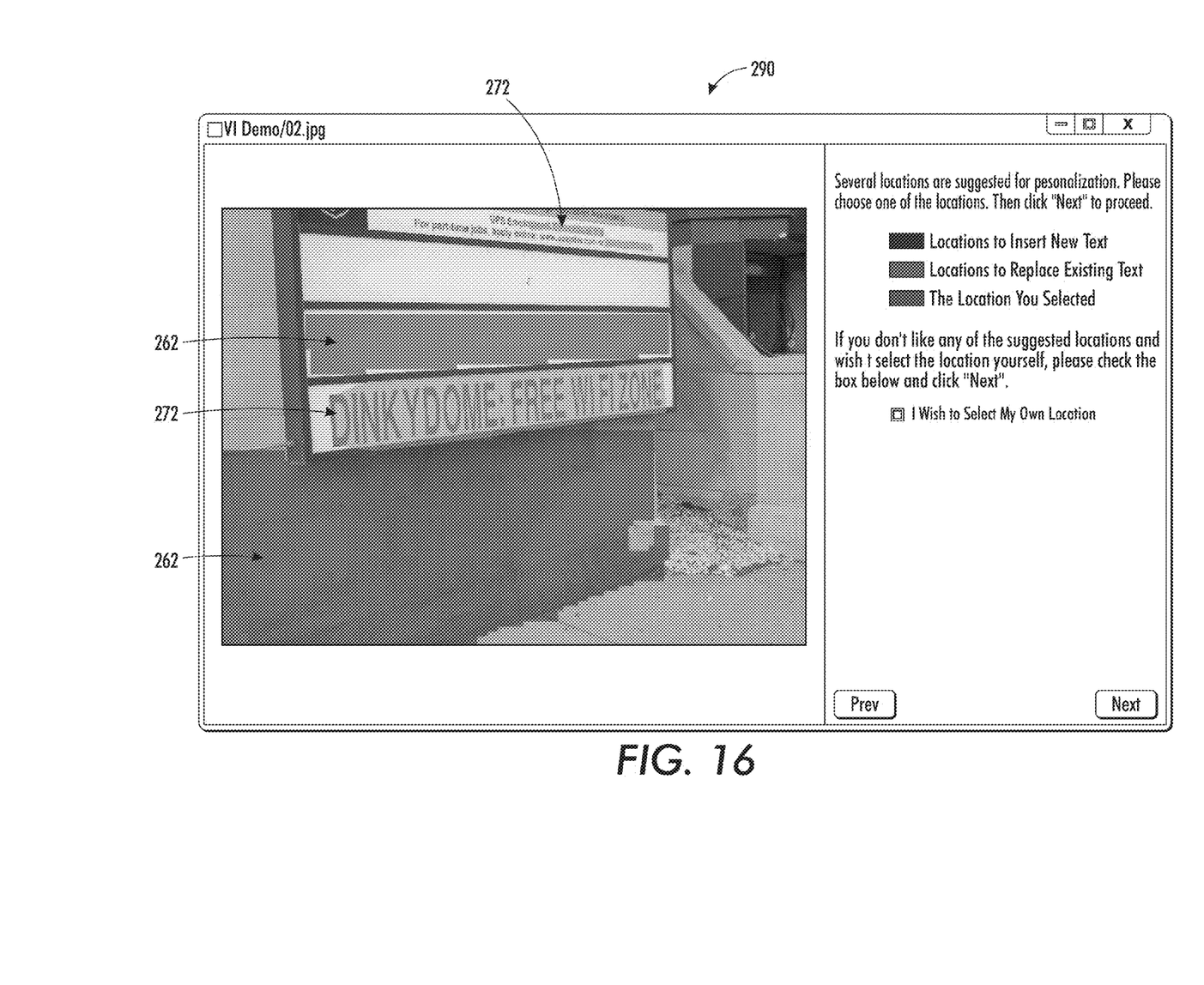
FIG. 16 is a screenshot of a GUI in which the herein-described methods are combined to identify both "good" candidate regions for personalization and text regions wherein existing text can be replaced to personalize the image.

FIG. 16 is a screenshot of a GUI 290 in which the herein-described methods of FIGS. 1-4 and the text identification techniques are combined to identify both "good" candidate regions 262 (e.g., regions having a flat surface in the image and comprising a minimum surface area of the region (e.g., 5% of the image or some other minimum surface area)) for personalization (see, e.g., FIG. 13) and text regions 272 (see, e.g., FIGS. 14 and 15) wherein existing text can be replaced to personalize the image.

Regarding the generation of a suitability metric for personalization at 108, given the "good" (smooth or flat) regions and/or text regions identified by the methods described herein, the objective is to combine information about the identified regions to develop an overall SFP metric. In one embodiment, labels associated with each region are employed when the classifier is applied. For example, the labels "Bad", "Moderate", and "Good" are assigned for each smooth region, respectively. In a numerical example, the labels can be 0, 1, 2, etc. (with 0 being the lowest or "bad" rating, for instance), as will be appreciated by those of skill in the relevant art. Similar classification is done on text regions, permitting additional labels to be assigned. For example, if text regions are preferred over all other suitable regions, a value of 3 or "excellent" for such regions can be assigned. The region ratings can then be combined to obtain the overall SFP metric.

The aggregate metric can be then obtained in many ways, with one example being the L-infinity norm such that:

$$SFP = \max_i S(i)$$

wherein the quality of the overall image is equivalent to that of the best identified region, and therefore also falls into one of the 4 categories: "Bad", "Moderate", "Good", and "Excellent". Alternatively, L-p norms can be employed, where p values can be chosen based on heuristics and/or or trained using an algorithm. Other metrics such as an average, median, or percentile of region ratings can also be used, which provide a finer granularity of achievable SFP values.

It will be understood that the foregoing methods, techniques, procedures, etc., are executable by a computer, a processor, or the like, such as the computer 50 described herein and/or the processor (not shown) comprised thereby and described with regard thereto.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A computer-implemented method for pre-analyzing an image for text-based personalization comprising:
   receiving an image selected by a user;
   automatically analyzing the image and identifying candidate regions for personalization by:
   dividing the image into a grid of initial region blocks; and
   identifying a pair of adjacent initial region blocks that are statistically most similar relative to other initial region blocks;
   presenting the candidate regions to the user via a graphical user interface (GUI);
   deriving an overall metric for the suitability for personalization (SFP) of the image;
   estimating a multivariate Gaussian distribution for the color channels of pixels inside each region block to be combined;
   generating a block-to-block distance metric for the estimated Gaussian distributions such that:

$$D(B_1,B_2)=\tfrac{1}{2}(KL(B_1\|B_2)+KL(B_2\|B_1)).$$

2. The method according to claim 1, wherein identifying candidate regions for personalization further comprises:
   combining the identified pair of adjacent initial region blocks into a single aggregate region;
   iteratively identifying and combining one or more of initial and aggregate region blocks until a statistical threshold used to determine similarity is exceeded, and outputting at least one finalized region for personalization once the threshold is exceeded;
   classifying each of the at least one finalized regions into one of M categories that indicate various SFP levels, where M is an integer; and
   presenting to the user, via the GUI, candidate regions for personalization, the candidate regions being finalized regions classified as having a highest SPF level relative to other regions.

3. The method according to claim 2, wherein identifying a pair of adjacent region blocks that are statistically most similar and combining the identified region blocks into a single region further comprises:
   defining a distance metric for the region blocks to be combined;
   setting the statistical threshold used to determine similarity to 1; and
   removing, from the finalized regions, region blocks that comprise less than a predetermined percentage of the total image area.

4. The method according to claim 3, wherein identifying pairs of statistically similar adjacent regions further comprises:
   computing a Kullback-Leibler (KL) divergence for two initial region blocks $B_1$ and $B_2$ that are adjacent, wherein the KL divergence is given by:

$$KL(B_1\|B_2) = \frac{1}{2}\sum_i\left(\ln\frac{\sigma_{i,2}^2}{\sigma_{i,1}^2} + \frac{\sigma_{i,1}^2}{\sigma_{i,2}^2} + \frac{(\mu_{i,1}-\mu_{i,2})^2}{\sigma_{i,2}^2} - 1\right),$$

with $\{(\mu_{i,1},\sigma_{i,1}^2)|i=L^*,a^*,b^*\}$ and $\{(\mu_{i,2},\sigma_{i,2}^2)|i=L^*,a^*,b^*\}$ being the means and variances for the Gaussian distributions on $B_1$ and $B_2$, respectively.

5. The method according to claim 4, wherein the distance metric for two regions $R_1$ and $R_2$, is an average of block-to-block distance metrics computed over all pairs of adjacent blocks from the two regions, given by:

$$D(R_1, R_2) = \frac{1}{N}\sum_{i,j} D(B_i, B_j) \text{ where } i\in R_1,\, j\in R_2,\, i\in \partial j$$

where N is the total number of adjacent block pairs from the two regions.

6. The method according to claim 2, wherein classifying each region into one of M categories indicating the SFP level of the region further comprises:
   extracting a set of features within each region to be used to train a classifier to classify subsequent image regions;
   training the classifier using a set of ground-truth regions that have been manually labeled as falling into one of the M categories; and
   assigning a set of features corresponding to an arbitrary image region to the category with the largest posterior probability.

7. The method according to claim 1, wherein identifying candidate regions for personalization further comprises identifying regions containing text characters, including the steps of:
   performing connected component analysis to determine closed contours as potential text characters;
   linking adjacent text characters into text lines using a set of heuristics based on size and proximity of the characters;
   employing color information to eliminate spurious linkages; and
   executing a classification algorithm based on a set of relevant features to further eliminate regions containing non-text characters.

8. The method according to claim 1, wherein deriving an overall metric for the SFP of the image further comprises:
   associating a label with each region when the classifier is applied.

9. The method according to claim 1, wherein deriving an overall metric for the SFP of the image further comprises:
   generating the overall metric using an L-infinity norm such that:

$$SFP = \max_i S(i);$$

wherein the SFP for the image is equal to the quality of an optimal identified region S relative to other regions in the image.

10. The method according to claim 1, further comprising appending the SFP for the image to the image data file and storing both the image data file and its SFP to memory.

11. The method according to claim 1, wherein the initial regions blocks are 12×12 blocks of pixels.

12. A computerized system that facilitates pre-analyzing an image for text-based personalization comprising:
    a memory that stores computer-executable instructions; and
    a processor configured to execute the instructions, the instructions comprising:
    receiving an image selected by a user;
    automatically analyzing the image and identifying candidate regions for personalization by:
    dividing the image into a grid of initial region blocks; and
    identifying a pair of adjacent initial region blocks that are statistically most similar relative to other initial region blocks;
    presenting the candidate regions to the user via a graphical user interface (GUI);
    deriving an overall metric for the suitability for personalization (SFP) of the image;
    estimating a multivariate Gaussian distribution for the color channels of pixels inside each region block to be combined;
    generating a block-to-block distance metric for the estimated Gaussian distributions such that:

$$D(B_1, B_2) = \frac{1}{2}(KL(B_1 \| B_2) + KL(B_2 \| B_1)).$$

13. The system according to claim 12, wherein the instructions for identifying candidate regions for personalization further comprise instructions for:
    combining the identified pair of adjacent initial region blocks into a single aggregate region;
    iteratively identifying and combining one or more of initial and aggregate region blocks until a statistical threshold used to determine similarity is exceeded, and outputting at least one finalized region for personalization once the threshold is exceeded;
    classifying each of the at least one finalized regions into one of M categories that indicate various SFP levels, where M is an integer; and
    presenting to the user, via the GUI, candidate regions for personalization, the candidate regions being finalized regions classified as having an optimal SPF level relative to other regions.

14. The system according to claim 13, wherein the instructions for identifying a pair of adjacent region blocks that are statistically most similar and combining the identified region blocks into a single region further comprise instructions for:
    defining the distance metric for the region blocks to be combined;
    setting the statistical threshold used to determine similarity to 1; and
    removing, from the finalized regions, region blocks that comprise less than a predetermined percentage of the total image area.

15. The system according to claim 14, wherein the instructions for identifying pairs of statistically similar adjacent regions further comprise instructions for:
    computing a Kullback-Leibler (KL) divergence for two initial region blocks $B_1$ and $B_2$ that are adjacent, wherein the KL divergence is given by:

$$KL(B_1 \| B_2) = \frac{1}{2} \sum_i \left( \ln \frac{\sigma_{i,2}^2}{\sigma_{i,1}^2} + \frac{\sigma_{i,1}^2}{\sigma_{i,2}^2} + \frac{(\mu_{i,1} - \mu_{i,2})^2}{\sigma_{i,2}^2} - 1 \right),$$

with $\{(\mu_{i,1}, \sigma_{i,1}^2) | i = L^*, a^*, b^*\}$ and $\{(\mu_{i,2}, \sigma_{i,2}^2) | i = L^*, a^*, b^*\}$ being the means and variances for the Gaussian distributions on $B_1$ and $B_2$, respectively.

16. The system according to claim 15, wherein the distance metric for two regions $R_1$ and $R_2$, is an average of block-to-block distance metrics computed over all pairs of adjacent blocks from the two regions, given by:

$$D(R_1, R_2) = \frac{1}{N} \sum_{i,j} D(B_i, B_j) \text{ where } i \in R_1, j \in R_2, i \in \partial j$$

where N is the total number of adjacent block pairs from the two regions.

17. The system according to claim 13, wherein the instructions for classifying each region into one of M categories indicating the SFP level of the region further comprise instructions for:
    extracting a set of features within each region to be used to train a classifier to classify subsequent image regions;
    training the classifier using a set of ground-truth regions that have been manually labeled as falling into one of the M categories; and
    assigning a set of features corresponding to an arbitrary image region to the category with the largest posterior probability.

18. The system according to claim 12, wherein the instructions for identifying candidate regions for personalization further comprise instructions for identifying regions containing text characters, including the instructions for:
    performing connected component analysis to determine closed contours as potential text characters;
    linking adjacent text characters into text lines using a set of heuristics based on size and proximity of the characters;
    employing color information to eliminate spurious linkages; and
    executing a classification algorithm based on a set of relevant features to further eliminate regions containing non-text characters.

19. The system according to claim 12, wherein the instructions for deriving an overall metric for the SFP of the image further comprise instructions for:
    associating a label with each region when the classifier is applied;
    generating the overall metric using an L-infinity norm such that:

$$SFP = \max_i S(i);$$

where wherein the SFP for the image is equal to the quality of an optimal identified region S relative to other regions in the image.

20. The system according to claim 12, wherein the initial regions are 12×12 blocks of pixels.

* * * * *